(12) United States Patent
Kasper et al.

(10) Patent No.: US 9,683,065 B2
(45) Date of Patent: Jun. 20, 2017

(54) METHOD FOR DEGRADING (CO)POLYMERS IN AN EXTRUDER AND EXTRUDER FOR PERFORMING THE METHOD

(71) Applicant: HENKEL AG & CO. KGAA, Duesseldorf (DE)

(72) Inventors: Dirk Kasper, Duesseldorf (DE); Andreas Brenger, Duesseldorf (DE); Ilja Thierbach, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 14/735,284

(22) Filed: Jun. 10, 2015

(65) Prior Publication Data
US 2015/0274873 A1    Oct. 1, 2015

Related U.S. Application Data

(63) Continuation of application No. PCT/EP2013/075303, filed on Dec. 3, 2013.

(30) Foreign Application Priority Data

Dec. 12, 2012    (DE) .................. 10 2012 222 991

(51) Int. Cl.
*C08F 8/50* (2006.01)
*C08F 236/04* (2006.01)
*B29C 47/08* (2006.01)
*B29C 47/10* (2006.01)
*B29C 47/60* (2006.01)
*B29C 47/76* (2006.01)
*B01F 7/00* (2006.01)
*C08F 210/16* (2006.01)

(52) U.S. Cl.
CPC ........ *C08F 236/04* (2013.01); *B01F 7/00416* (2013.01); *B29C 47/0871* (2013.01); *B29C 47/1072* (2013.01); *B29C 47/1081* (2013.01); *B29C 47/6018* (2013.01); *B29C 47/6025* (2013.01); *B29C 47/767* (2013.01); *C08F 8/50* (2013.01); *C08F 210/16* (2013.01); *B01F 2215/0049* (2013.01); *C08F 2810/10* (2013.01)

(58) Field of Classification Search
CPC .............................. C08F 8/50; C08F 2810/10
See application file for complete search history.

(56) References Cited

U.S. PATENT DOCUMENTS 3,898,209 A * 8/1975 Watson ............... B29C 47/1063
                                                        264/176.1
3,940,379 A * 2/1976 Castagna ................. C08F 8/50
                                                        525/387
(Continued)

FOREIGN PATENT DOCUMENTS

DE    4413093 A1    10/1995
DE    4000695 C2    7/1997
(Continued)

OTHER PUBLICATIONS

Translation of EP 1767333 (2007).*

*Primary Examiner* — Robert C Boyle
(74) *Attorney, Agent, or Firm* — Sun Hee Lehmann (57) ABSTRACT

The invention relates to a method for degrading (co)polymers in an extruder and an extruder suitable for performing said method.

15 Claims, 3 Drawing Sheets

(56) References Cited

U.S. PATENT DOCUMENTS 5,587,434 A * 12/1996 McCullough, Jr. ....... C08F 8/00
                                                                              525/333.8
6,204,348 B1 * 3/2001 Raetzsch ............... C08F 255/02
                                                                              524/572

FOREIGN PATENT DOCUMENTS

| DE | 19650414 A1 | | 2/1998 |
|----|-------------|---|--------|
| DE | 102006010458 A1 | | 9/2007 |
| EP | 1767333 | * | 3/2007 |
| EP | 1767333 A1 | | 3/2007 |
| WO | 2006023213 A1 | | 3/2006 |
| WO | 2012013699 A1 | | 2/2012 |

* cited by examiner

METHOD FOR DEGRADING (CO)POLYMERS IN AN EXTRUDER AND EXTRUDER FOR PERFORMING THE METHOD

FIELD OF THE INVENTION

The present invention relates to a method for degrading (co)polymers in an extruder, and to an extruder suitable for performing said method.

The degradation of (co)polymers with the aid of extruders is sufficiently known. The action of shear forces at high temperatures makes it possible to selectively reduce or decompose the molecular weight of (co)polymers, due to the resulting thermomechanical stress. A further increase in the efficiency of the decomposition process is possible when said process is carried out in the presence of radical formers, such as, for example, peroxides.

BACKGROUND OF THE INVENTION

In this context, patent document DE 4000695 C2 describes, for example, a method for producing substantially amorphous poly-alpha-olefins, which are prepared from higher-molecular-weight amorphous poly-alpha-olefins through shear stress above the softening point, in the presence of a radical former, wherein the melt viscosity of the higher-molecular-weight amorphous poly-alpha-olefins is lowered by at least half. The amorphous poly-alpha-olefins produced in this manner can be used in heavy coating masses for carpets, or hot melt adhesives. Peroxides are disclosed as examples of suitable radical formers.

One disadvantage of the above method has been found to be that high safety requirements need to be met, because a variety of radical formers, such as peroxides, exhibit a high hazard potential. Furthermore, as peroxides decay, volatile components are released, which can lead to an undesirable foaming of the degraded polymer in the extruder. In addition, the use of larger amounts of peroxides often leads to inefficiency of the method, because these materials represent a high portion of costs in the total costs of the method.

Beyond peroxides, it is also possible to use oxygen or oxygen-containing gasses in order to degrade polymers in an extruder. Patent document DE 4413093 A1 discloses, for example, a method for producing functionalized low-molecular-weight polymers from waste plastics, in which high-molecular-weight plastics are decomposed under molecular weight reduction at temperatures of 300° C. to 410° C., in the presence of oxygen or oxygen-containing gases.

Due to the difficulty of controlling effective oxygen entry into the polymer melt, the above-mentioned method has problematic reproducibility. Also, in the exclusive use of oxygen or an oxygen-containing gas, even at very high temperatures, it is not always possible to make the degradation process so effective that polymers with low viscosities are obtained.

BRIEF SUMMARY OF THE INVENTION

The present invention therefore addresses the problem of providing a method that makes it possible to overcome at least some of the described disadvantages of the prior art. In particular, the method is intended to enable production of degraded (co)polymers with low viscosities in a cost-effective and energy-efficient process that is as safe as possible, wherein preferably an undesired or uncontrolled foaming of the obtained (co)polymers is avoided to the greatest possible extent.

This present problem is solved by the methods according to the invention, and by the extruder suitable for performing said methods.

DETAILED DESCRIPTION OF THE INVENTION

The method according to the invention is based on the sequential degradation of (co)polymers in an extruder, wherein the (co)polymer used is degraded by the action of at least one radical former in a first extrusion section, while a further decomposition of the (co)polymer is achieved by means of an oxygen gas in a second extruder section.

The method according to the invention for degrading (co)polymers in an extruder comprises the following steps:
a) supplying a (co)polymer by means of a charging opening in a first extrusion section of the extruder;
b) degrading the (co)polymer under shear stress in the first extrusion section, in the presence of at least one radical former, in order to produce a first degraded (co)polymer;
c) transferring the first degraded (co)polymer from the first extrusion section into a second extrusion section of the extruder, wherein the first extrusion section is separated from the second extrusion section by a sealing means;
d) supplying oxygen gas into the second extrusion section by means of a feed opening, wherein the feed opening is arranged downstream of the sealing means in the direction of extrusion; and
e) further degrading the first degraded copolymer under shear stress in the second extrusion section, in the presence of an oxygen gas, in order to produce a second degraded (co)polymer;

with the provision that the sealing means is suitable for preventing the escape of the oxygen gas from the charging opening.

This method according to the invention is also designated hereinafter as the first method according to the invention.

Another subject matter of the present invention is an extruder suitable for performing the described method. The extruder according to the invention for degrading (co)polymers comprises:
   an extrusion chamber containing at least two extrusion sections;
   a charging opening for charging the first extrusion section with at least one (co)polymer;
   optionally, a radical former adding means for adding a radical former into the first extrusion section;
   a feed opening for adding an oxygen gas into the second extrusion section;
   a sealing means separating the first extrusion section from the second extrusion section, the sealing means being provided between the charging opening and the feed opening, wherein the sealing means is suitable for preventing the escape of the supplied oxygen gas from the charging opening; and optionally, a decomposition means for decomposing the oxygen gas, the decomposition means being arranged downstream of the feed opening as seen in the direction of extrusion.

A "(co)polymer" for the purposes of the present invention refers to both a homopolymer and a copolymer, wherein the term also encompasses mixtures of different homopolymers and copolymers, as well as mixtures of homopolymers and copolymers. Examples of suitable (co)polymers include polypropylene homopolymers or copolymers of propylene with different comonomers, such as ethylene and/or $C_4$ to $C_{20}$ alpha-olefins.

The term "extruder" for the purposes of the present invention may preferably refer to both single-screw extruders and twin-screw extruders. The latter are technically more complex and are offered in different configurations. A distinction is made in particular between co-rotating or counter-rotating types, tightly intermeshed or tangential types, types that are open or closed lengthwise or crosswise, and cylindrical or conical types. It would also be possible to use compounders, expansion extruders, or planetary extruders. Preferably, at least one twin-screw extruder is used for the method according to the invention.

An extruder that is being used may further include a housing having a feed side and a discharge side, in which at least one screw may be rotatably supported, a (for example) helically-extending flight protruding out from the screw core thereof. On the feed side, the housing may comprise at least one feed opening for the (co)polymers intended to be processed in the extruder, as well as optionally one or more charging openings for additives, admixtures, and/or auxiliaries; preferably at least in the vicinity of the discharge side, the housing may also comprise at least one degassing opening, to which, for example, a vacuum may be applied, in particular in order to suction volatile components of the (co)polymer.

The housing, and in particular the liner for one or more extruder screws, can preferably be heated and/or cooled at least in certain areas, in order to influence the temperature of the (co)polymer. Additionally or alternatively, it is also conceivable to equip a screw itself with an option for a heat exchange fluid to flow through. The extruder may thus comprise one or more temperature zones. Preferably, the extruder comprises a plurality of different temperature zones, wherein the temperatures thereof can be regulated independently of one another.

An extruder that is being used may further comprise a plurality of extruder zones. An "extruder zone" for the purposes of the present invention refers to functional zones of the extruder, such as, for example, an entry zone in which the (co)polymer intended to be processed is, for example, fed via a hopper at the feed opening into the extruder and, for example, advanced forward by one or more extruder screws; a plastification zone or compression zone, in particular for melting or plasticizing the (co)polymer; or a degradation zone or high-temperature zone. Another example for an extruder zone that is used would be a mixing zone, a degassing zone, or a discharge or metering zone, in which, for example, a melt of the (co)polymer can be brought to the desired processing temperature and can be homogenized.

The extruder further comprises at least two extrusion sections. An "extrusion section" for the purposes of the present invention refers to a functional section of any configuration and size, which can contain a plurality of extruder zones, wherein the (co)polymer, having been introduced via the feed opening, is preferably thermomechanically degraded in a first extrusion section, and the first degraded (co)polymer is further degraded in the second extrusion section, preferably under shear stress in the presence of an oxygen gas, in order to produce a second degraded (co)polymer, the first extrusion section being separated by a sealing means from the second extrusion section.

As the sealing means, it would be possible to use, in particular, a damming unit within the extrusion chamber. The damming unit serves to reduce the throughput or the passage of the (co)polymer having been degraded in the first extrusion section. For this purpose, in particular, damming elements can be provided, which make it possible to throttle the throughput or passage of the (co)polymer, having been degraded in the first extrusion section, prior to arrival at the second extrusion section. This may be, in particular, a smaller cross-section of the extrusion chamber in order to reduce the passage space, a larger cross-section of the extruder screw(s) in order to reduce the passage space, or a combination of the two features, which can enable damming of the (co)polymer having been degraded in the first extrusion section, and consequently enable a sealing action. In addition, it is also additionally or alternatively conceivable to have such a design of the extruder screw(s) that the feed rate of the (co)polymer having been degraded in the first extrusion section is minimized within the extrusion chamber such that damming of this degraded (co)polymer and consequently a sealing action can be enabled. It is also conceivable, in particular by a special configuration of the extruder screw(s), to have return feeding elements or return feeding areas that enable a sealing off by means of damming of the melt and/or the extrudate, i.e., the (co)polymer. The sealing means according to the invention is configured in that the oxygen gas that has been introduced into the second extrusion section does not reach the first extrusion section, and preferably escaping of the oxygen gas from the charging opening can be prevented.

It shall be readily understood that further extrusion sections can be provided; in particular, further extrusion sections can be provided between the two aforementioned extrusion sections. Optionally, at least one further extrusion section can adjoin the described second extrusion section.

According to the invention, it is conceivable that the two and optionally additional extrusion sections would be provided within one extruder. Alternatively, however, it is also conceivable that a separate extruder would be provided for each extrusion section being used. Preferably, however, only one extruder is used for both extrusion sections, because this structure can possess, for example, higher efficiency. The higher efficiency as compared to an embodiment having two extruders is a consequence, in particular, of the lower space requirements and the lower maintenance costs for the driving of the extruder screws.

The term "degradation" for the purposes of the present invention refers to the process of decomposition of the (co)polymer, which takes place in the extruder under the effect of heat and shear stress and in which polymer chains are shortened and molecular weight is reduced.

A "degraded (co)polymer" for the purposes of the present invention refers to a polymer that is produced by degradation in an extruder from the (co)polymer used. Herein, the weight-average molecular weight ($M_w$) of the first degraded (co)polymer, as determined under comparable conditions, is always lower than the weight-average molecular weight ($M_w$) of the (co)polymer used, and the weight-average molecular weight ($M_w$) of the second degraded (co)polymer is always lower than the weight-average molecular weight ($M_w$) of the first degraded (co)polymer.

A "radical former" for the purposes of the present invention refers to a substance that decays into radicals due to external influences, such as heat and/or radiation.

The (co)polymer used in the method according to the invention can be selected, for example, from polypropylene copolymers. Suitable polypropylene copolymers, in a polymerized form, include propylene as well as at least one additional comonomer, which is preferably selected from ethylene and/or $C_4$ to $C_{20}$ alpha-olefins. Preferred $C_4$ to $C_{20}$ alpha-olefins include butene, pentene, hexene, heptene, octene, nonene, decene, dodecene, 4-methyl-1-pentene, 3,5,5-trimethyl-1-hexene, and 5-ethyl-1-nonene. In one embodiment of the invention, terpolymers based on propylene, ethylene, and $C_4$ to $C_{20}$ alpha-olefins are used as polypropylene copolymers.

For example, in the method according to the invention, polymer mixtures of polypropylene (co)polymers and ethylene propylene rubbers (EPR) and/or ethylene propylene diene monomer (EPDM) rubbers can also be used as (co)polymers.

The term "ethylene propylene rubber" for the purposes of the present invention designates elastomeric copolymers of ethylene and propylene, said polymers having optionally been modified with functional monomers and/or functional groups.

The term "ethylene propylene diene monomer rubber" designates elastomeric terpolymers that comprise propylene, ethylene, and at least one diene, the diene being selected, for example, from 1,4-hexadiene, norbornadiene, ethylidenenorbornene, dicyclopentadiene, butadiene, and isoprene. The aforementioned terpolymers may optionally be modified with other functional monomers and/or functional groups.

EPRs and EPDM rubbers are, for example, commercially available from Exxon Chemical Company under the trade name VISTALON®, and from DMS Polymers, Inc. under the trade name KELTON®. Functionally modified EPDM rubbers that contain anhydride groups are sold under the trade name EXXELOR® from Exxon Chemical Company.

The described polymer mixture can, for example, by produced by mechanical blending of at least one EPR/EPDM rubber with at least one polypropylene (co)polymer. Alternatively, the aforementioned polymer mixture can be produced in the form of a polymer alloy, also in situ by stepwise polymerization in a single reactor, or in a series of parallel reactors. One example of such an in situ production is the Catalloy method developed by Montell North America Inc. With the aid of the Catalloy method, it is possible to obtain, for example, thermoplastic olefins (TPOs) of the variety Adflex (Montell North America, Inc.) that constitute blends or alloys of EPRs with polypropylene (co)polymers and, for the purposes of the present invention, can be used advantageously as starting materials in the method according to the invention.

If polymer blends of polypropylene (co)polymers and EPRs and/or EPDM rubbers are used in the method according to the invention, then preferably the proportion of EPRs or EPDM rubbers accounts for 5 to 80 wt %, preferably 20 to 70 wt %, in each case with respect to the total amount of polypropylene (co)polymers and EPRs and/or EPDM rubbers. In this manner, after the method according to the invention has been performed, it is possible to obtain adhesives, such as hot melt adhesives, that possess high cohesion and flexibility.

The propylene content in the polypropylene copolymer is preferably between 50 and 99 wt %, in particular between 60 and 95 wt %, and particularly preferably between 65 and 90 wt %, in each case with respect to the total weight of the polypropylene copolymer. Polypropylene copolymers that have propylene in the above-mentioned proportion by weight are particularly advantageous because said (co)polymers can be converted into the respective degradation products particularly effectively in the method according to the invention under significant molecular weight reduction and lowering of viscosity.

Where present, the ethylene content in the polypropylene copolymer is preferably between 1 and 35 wt %, particularly preferably between 2 and 25 wt %, in each case with respect to the total weight of the polypropylene copolymer. Polypropylene copolymers having ethylene in the aforementioned proportion by weight can also be effectively converted into the respective degradation products.

The weight-average molecular weight ($M_w$) of the (co)polymers used in the method according to the invention is preferably 100,000 to 300,000,000 g/mol, particularly preferably 150,000 to 3,000,000 g/mol, and very particularly preferably 250,000 to 1,000,000 g/mol, wherein, in the context of the present invention, the weight-average molecular weight is determined by means of gel permeation chromatography (GPC) with the use of a polystyrene standard.

The use of high-molecular-weight (co)polymers having a weight-average molecular weight of at least 100,000 g/mol, preferably at least 150,000 g/mol, and particularly at least 250,000 g/mol is advantageous because the aforementioned (co)polymers can be produced inexpensively and can be effectively decomposed to form the respective degradation products.

Due to the degradation carried out in the method according to the invention and the associated molecular weight reduction, it is generally not appropriate for low-molecular-weight (co)polymers having a weight-average molecular weight ($M_w$) of less than 100,000 g/mol to be used as starting materials.

Preferably, step (b) of the method according to the invention is carried out in such a manner that the weight-average molecular weight ($M_w$) of the first degraded (co)polymer, upon entry into the second extrusion section, is less than 70%, preferably less than 50%, particularly preferably less than 30%, and most preferably less than 20% of the weight-average molecular weight ($M_w$) of the (co)polymer used, as determined under identical conditions.

The further degradation in step (e) of the method according to the invention is preferably carried out in such a manner that the ultimately obtained weight-average molecular weight ($M_w$) of the second degraded (co)polymer is less than 70%, preferably less than 50%, particularly preferably less than 30%, and most preferably less than 20% of the weight-average molecular weight ($M_w$) of the first degraded (co)polymer as determined under identical conditions.

The ultimately obtained weight-average molecular weight ($M_w$) of the second degraded (co)polymer is preferably 10,000 to 90,000 g/mol, particularly preferably 20,000 to 80,000 g/mol, most preferably 30,000 to 60,000 g/mol.

The (co)polymer used in the method according to the invention preferably has a melt viscosity of at least 300,000 mPa·s, as determined at 200° C. In particular, the melt viscosity of the (co)polymer as determined at 200° C. is between 350,000 and 20,000,000 mPa·s, preferably between 400,000 and 10,000,000 mPa·s, and particularly preferably between 450,000 and 5,000,000 mPa·s.

In the context of the present invention, the melt viscosity of the respective (co)polymers is determined at 200° C. with the aid of a Brookfield Thermosell RVT viscometer (available from Brookfield Engineering Laboratories, Inc., Stoughton, Mass., USA). For viscosities of up to 100,000 mPa·s, a spindle 27 is used, while a spindle 29 is used for determining melt viscosities greater than 100,000 mPa·s. The rotation speed of the spindle being used is then preferably selected so that the torque value obtained at 200° C. is 10% to 95%, in particular 50%.

It is additionally advantageous if step (b) of the method according to the invention is performed in such a manner that upon entry into the second extrusion section, the melt viscosity of the first degraded (co)polymer, as determined at 200° C., is less than 70%, preferably less than 50%, particularly preferably less than 30%, and most preferably less than 20% of the melt viscosity of the (co)polymer used, likewise as determined at 200° C.

Moreover, it is advantageous if step (e) of the method according to the invention is performed in such a manner that the ultimately obtained melt viscosity of the second degraded (co)polymer is less than 70%, preferably less than 50%, particularly preferably less than 30%, and most preferably less than 20% of the melt viscosity of the first degraded (co)polymer, likewise as determined at 200° C.

The ultimately obtained melt viscosity of the second degraded (co)polymer as determined at 200° C. is preferably 500 to 1,000,000 mPa·s, particularly preferably 1,000 to 500,000 mPa·s, most preferably 2,000 to 250,000 mPa·s, and very particularly preferably 2,500 to 150,000 mPa·s.

The sequential degradation of the (co)polymer used in the extruder undertaken in the method according to the invention makes it possible to achieve extremely efficient reductions of molecular weight and viscosity even at relatively low amounts of radical formers, such as peroxides, and relatively low temperatures. It is therefore possible, after the second extrusion section, to obtain highly degraded (co)polymers that possess an extremely low molecular weight and extremely low melt viscosity as compared to the (co)polymers used.

In a preferred embodiment of the method according to the invention, therefore,
the ultimately obtained weight-average molecular weight ($M_w$) of the second degraded (co)polymer is less than 30%, preferably less than 20%, particularly preferably less than 10%, and most preferably less than 5% of the weight-average molecular weight ($M_w$) of the (co) polymer used, as determined under identical conditions, and/or
the ultimately obtained melt viscosity (200° C.) of the second degraded (co)polymer is less than 30%, preferably less than 20%, particularly preferably less than 10%, and most preferably less than 5% of the melt viscosity of the (co)polymer used.

In order to efficiently control the process of the degradation in the first extrusion section, it is possible for the (co)polymer to be added in the charging opening under a protective gas atmosphere, such as a nitrogen atmosphere and/or noble gas atmosphere. It is particularly advantageous for the entire method step (a) of the method according to the invention to be carried out under a protective gas atmosphere.

The degradation of the (co)polymer under shear stress in the first extrusion section takes place in the presence of at least one radical former, typically at temperatures above 50° C., wherein the optimal temperature depends, inter alia, on the amount and chemical nature of the radical former used. Preferably, the (co)polymer is degraded in the first extrusion section at a temperature of 100° C. to 320° C., particularly preferably 120° C. to 290° C., and very particularly preferably 140° C. to 280° C.

The radical former itself can be added in the first extrusion section via the charging opening and/or via a radical former adding means.

The radical formers used according to the invention are preferably compounds that contain peroxo or diazo groups, wherein peroxides, such as organic peroxides, are particularly preferable due to the good commercial availability and ease of handling thereof. Suitable radical formers can be selected, for example, from the following products or compounds and/or from any mixtures thereof: TRIGONOX 1010 (2,5-dimethyl-2,5-di-[tert-butylperoxyl]hexane), TRIGONOX 301® (3,6,9-triethyl-3,6,9-trimethyl-1,4,7-triperoxonane), both commercially available from AKZO; di-tert-amyl peroxide, commercially available from CK Witco as DTAP® and from AKZO as Trigonox 201®; dicumyl peroxide, di-tert-butyl peroxide, 2,5-dimethyl-2,5-di(tert-butyl peroxy)-3-hexyne, 1,3-bis(tert-butylperoxy isopropyl)phenyl, 1,1-bis(tert-butylperoxy)-3,3,5-trimethyl cyclohexane, n-butyl-4,4-bis(tert-butylperoxy)valerate, benzoyl peroxide, p-chlorobenzoyl peroxide, 2,4-dichlorbenzoyl peroxide, tert-butyl peroxybenzoate, tert-butylperoxy isopropyl carbonate, diacetyl peroxide, lauroyl peroxide, tert-butylcumyl peroxide, and tert-butylperoxy-2-ethyl-hexanoate.

Preferred peroxides possess a half-life of 0.01 to 10 hours, preferably 0.1 to 5 hours, and particularly preferably 0.3 to 3 hours, as determined in monochlorobenzene at 150° C.

With respect to the total amount of (co)polymer, it is advantageous for the purposes of the method according to the invention for the radical former to be added in the amount of 0.02 to 5 wt %, preferably 0.05 to 2 wt %, and in particular 0.1 to 1 wt %.

Preferably, as the radical former, a peroxide is added in the amount of 0.05 to 3 wt %, particularly preferably 0.1 to 2 wt %, and in particular 0.2 to 1 wt %, in each case with respect to the total amount of (co)polymer.

The described amount of radical former or peroxide makes it possible to perform the degradation process at a temperature of 100° C. to 320° C., preferably 120° C. to 290° C., and particularly preferably 140° C. to 280° C., wherein relatively short residence times of 0.1 to 3 minutes in the first extrusion section can be realized.

It is particularly preferable for the first degraded (co) polymer, upon entry into the second extrusion section, to have a proportion of radical formers that is less than 0.01 wt %, preferably less than 0.005 wt %, and particularly preferably less than 0.001 wt %, in each case with respect to the total amount of the first degraded (co)polymer.

The selection of a radical former that has a suitable half-life, the setting of a suitable temperature and a corresponding residence time of the (co)polymer in the first extrusion section makes it possible to control or influence the amount of radical former in the first degraded (co) polymer upon entry into the second extrusion section.

A residual concentration of radical formers of less than 0.01 wt % in the first degraded (co)polymer upon entry into the second extrusion section is advantageous because the small remaining amount of radical formers does not exert an interfering effect on the additional degradation in the second extrusion section. In particular, the safety of the second degradation process is improved by the nearly complete removal of the radical former.

In step (c) of the method according to the invention, the first degraded (co)polymer is transferred from the first extrusion section into the second extrusion section of the extruder, wherein the first extrusion section is separated from the second extrusion section by an aforementioned sealing means.

Subsequently, an oxygen gas is added to the second extrusion section via a feed opening, the feed opening being arranged downstream of the sealing means in the direction of extrusion. After the oxygen gas is supplied, the first degraded (co)polymer is further degraded in the second extrusion section, as well under shear stress, and in particular at temperatures above 50° C. Here, a second degraded (co)polymer is formed from the first degraded (co)polymer.

The further degradation of the degraded (co)polymer in the second extrusion section is preferably carried out at a temperature of 200° C. to 450° C., in particular at 220° C. to 400° C., and particularly preferably at 250° C. to 350° C. It is noteworthy that the first degradation in the presence of a radical former in step (b) of the method according to the invention makes it possible to significantly reduce the temperature in the second degradation step (e), as compared to a degradation methods that use only oxygen gas. In this manner, the total energy requirement of the method according to the invention is reduced, which improves the energy efficiency of said method considerably.

The oxygen gas supplied in the method according to the invention may be pure oxygen, or an oxygen-containing gas mixture. Particularly preferable as an oxygen-containing gas mixture are gas mixtures that comprise an oxygen content of at least 5 vol %, particularly preferably at least 10 vol %, and most preferably at least 20 vol %. For cost reasons, it is particularly advantageous to use ambient air or oxygen-enriched ambient air as the oxygen gas.

In order to achieve further functionalization of the degraded (co)polymer during the method according to the invention, it is possible to add at least one reactive component capable of a grafting reaction. The addition may take place, for example, in the first extrusion section via the charging opening with the (co)polymer or together with the radical former.

Alternatively, during and/or after the second degradation process, the corresponding (co)polymer can be further functionalized by having the supplied oxygen gas contain at least one reactive component capable of a grafting reaction. In this context, the method according to the invention makes it possible to precisely control the respective content of radical formers during the grafting reaction, because the amount of radical formers that remain can be controlled or adjusted by the conditions of the first gradation step.

Preferred reactive components capable of a grafting reaction include at least one unsaturated double and/or triple bond. Typical examples thereof are ethylenically unsaturated carboxylic acids or the derivatives thereof, such as anhydrides, esters, amides, nitriles or halides, vinyl-substituted aromatic or heteroaromatic compounds or aliphatic vinyl compounds, or the mixtures thereof. Preferred reactive components capable of a grafting reaction are compounds from the group of unsaturated carboxylic acids or the anhydrides thereof, the vinyl or divinyl aromatics, and the aliphatic dienes. Particularly preferred are maleic anhydride, styrene, acrylonitrile, methacrylonitrile, acrylic esters, and methacrylic esters.

In one embodiment of the method according to the invention, the reactive components capable of a grafting reaction are added in the amount of 0.001 to 1 wt %, preferably in the amount of 0.01 to 0.5 wt %, in each case with respect to the total amount of the degraded (co)polymers.

In an advantageous development of the present invention, the oxygen gas has a temperature of at least 50° C. prior to the addition. Moreover, it is advantageous if the oxygen gas is added at a pressure of at least 5 bar.

In order to further raise the degradation efficiency of the method according to the invention, the second degraded (co)polymer can be transferred from the second extrusion section into another extrusion section, the second extrusion section being separated from the other extrusion section by a sealing means and the other extrusion section comprising an additional charging opening and/or feed opening. In particular, the sealing means may be configured as described above, and, in particular, may be a damming unit described above. In the other extrusion section, at least one reactive component capable of a grafting reaction may also be added in order to achieve further functionalization of the (co)polymer.

In an advantageous development, the second and/or the other extrusion section comprises a decomposition means that is arranged downstream of the feed opening in the direction of extrusion in order to decompose the oxygen gas. In this manner, undesirable foaming of the degraded (co)polymer can be prevented or reduced. In particular, a vacuum and/or a return degassing stage are suitable as decomposition means.

In one embodiment of the present invention, the exit from the second extrusion section is followed by the transformation of the second degraded (co)polymer into a bulk material, in particular by means of a string pelletizer, an underwater pelletizer, or a pelletizer having a hot die face.

In an alternative embodiment of the method according to the invention, the sequential degradation of (co)polymers is carried out by reversing the decomposition steps, so that the (co)polymer used is degraded by means of an oxygen gas in a first extrusion section, and further decomposition of the (co)polymer is achieved by the action of at least one radical former in the second extrusion section.

This second method according to the invention for degrading (co)polymers in an extruder preferably comprises the following steps:
  i. supplying a (co)polymer by means of a charging opening into a first extrusion section of the extruder, wherein a first sealing means is arranged downstream of the charging opening in the direction of extrusion;
  ii. supplying oxygen gas into the first extrusion section by means of a first feed opening, wherein the feed opening is arranged downstream of the charging opening and downstream of the first sealing means in the direction of extrusion;
  iii. degrading the (co)polymer under shear stress in the first extrusion section, in the presence of an oxygen gas, in order to produce a first degraded (co)polymer;
  iv. transferring the first degraded (co)polymer from the first extrusion section into a second extrusion section of the extruder, wherein the first extrusion section is separated from the second extrusion section by a second sealing means;
  v. supplying at least one radical former by means of a radical former adding means into the second extrusion section, wherein the radical former adding means is arranged downstream of the second sealing means in the direction of extrusion; and
  vi. further degrading the first degraded (co)polymer under shear stress in the second extrusion section, in the presence of a radical former, in order to produce a second degraded (co)polymer;

with the provision that the first sealing means is suitable for preventing the escape of the oxygen gas from the charging opening and the second sealing means is suitable for preventing the escape of the oxygen gas from the radical former adding means.

Another subject matter of the present invention is an extruder suitable for performing the second method. The extruder according to the invention for degrading (co) polymers comprises:

an extrusion chamber containing at least two extrusion sections;
a charging opening for charging the first extrusion section with at least one (co)polymer;
a first sealing means arranged downstream of the charging opening in the direction of extrusion;
a first feed opening arranged downstream of the charging opening and downstream of the sealing means in the direction of extrusion, for adding an oxygen gas into the first extrusion section;
a second sealing means separating the first extrusion section from the second extrusion section, the second sealing means being provided downstream of the first feed opening in the direction of extrusion; and
a radical former adding means arranged downstream of the second sealing means in the direction of extrusion, for adding at least one radical former into the second extrusion section;

with the provision that the first sealing means is suitable for preventing the escape of the oxygen gas from the charging opening and the second sealing means is suitable for preventing the escape of the oxygen gas from the radical former adding means.

Where applicable, the foregoing preferred embodiments of the first method according to the invention relate explicitly also to the aforementioned second method according to the invention, and to the extruder suitable for performing the second method. This applies in particular to the configuration of the (co)polymer, the first degraded (co)polymer, the second degraded (co)polymer, the extrusion sections, the radical former, the oxygen gas, the charging opening, the feed opening, the radical former adding means, and the sealing means.

The degraded (co)polymers prepared by the first or second method according to the invention can be used advantageously as components of adhesives or hot melt adhesives. These adhesives or hot melt adhesives may be used, for example, to adhere substrates such as uncoated or coated paper, pre- and post-impregnated paper films or corresponding cardboards, films, plastics, or glass, as well as for other applications. With the aid of said adhesives or hot melt adhesives, it is possible to produce multilayer films, packagings, wood-adhered substrates, books, filters, nonwoven fabrics, artificial grass, or carpet backs, or containers such as folding boxes, covering boxes, or trays.

An extruder that can be used for the first method according to the invention is illustrated in the accompanying drawings.

Figure 1:
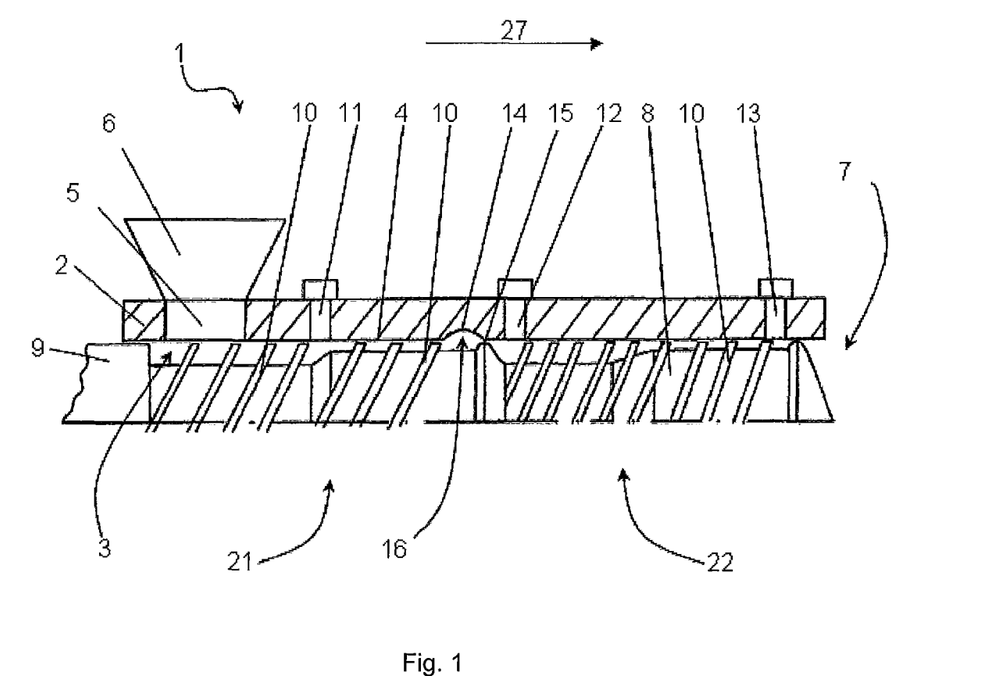
FIG. 1 illustrates a detail of a sectional side view of an extruder according to the invention for performing a method according to the invention.
Figure 2:
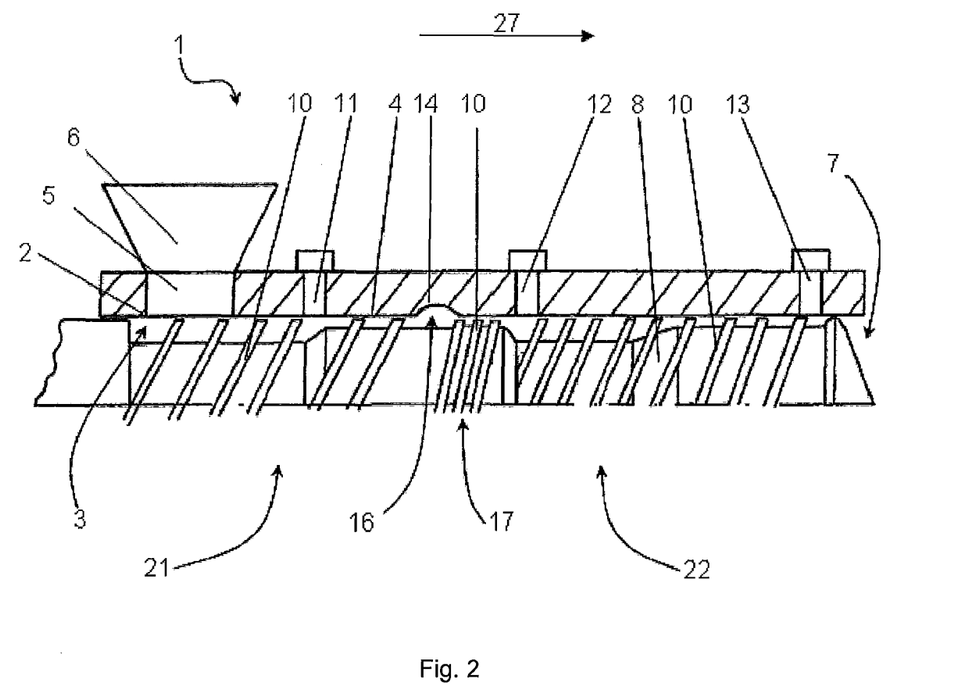
FIG. 2 illustrates an alternative embodiment of an extruder according to the invention.
Figure 3:
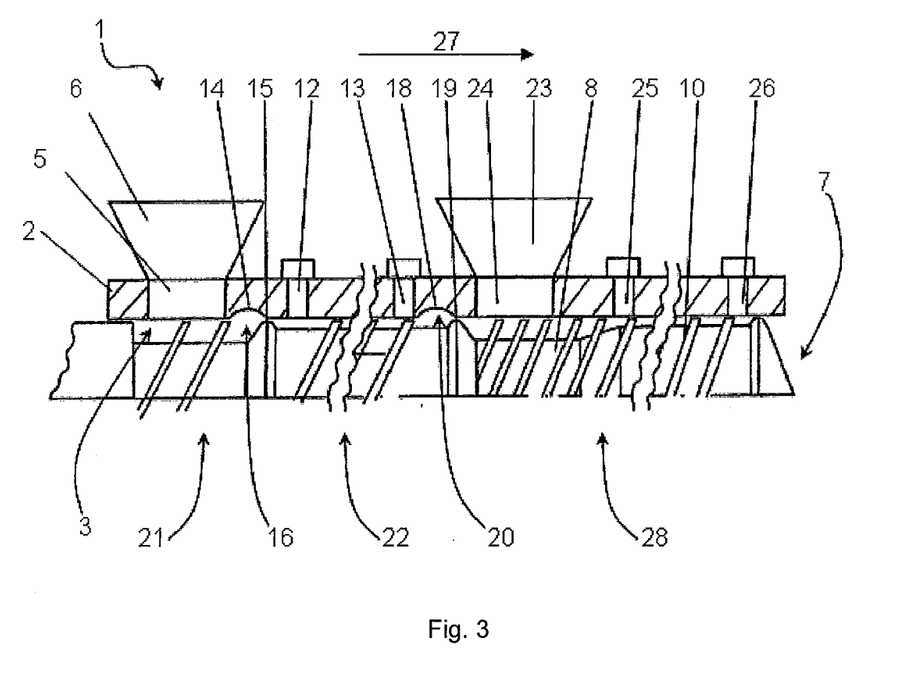
FIG. 3 illustrates another alternative of an extruder according to the invention.

FIG. 1 illustrates a detail of a sectional side view of an extruder according to the invention for performing a method according to the invention;

FIG. 2 illustrates an alternative embodiment of an extruder according to the invention; and FIG. 3 illustrates another alternative of an extruder according to the invention.

FIG. 1 illustrates a detail of a sectional side view of an extruder 1 according to the invention for preforming a method according to the invention. The extruder 1 serves to degrade a (co)polymer, and comprises a first extrusion section 21, which provides for the degradation of the (co) polymer under shear stress in the presence of at least one radical former in order to produce a first degraded (co) polymer. The extruder 2 further comprises a second extrusion section 22 that is arranged downstream of said first extrusion section 21 in a direction 27 of feeding of the (co)polymer and adjoins same; in which second extrusion section further degradation of the first degraded (co)polymer under shear stress in the presence of an oxygen gas, in order to produce a second degraded (co)polymer, is provided.

The illustrated extruder 1 is a multi-screw extruder—more precisely, a twin-screw extruder, in which two rotatable extruder screws 8 arranged in parallel to one another are provided in a housing 2, which has an inner wall 4 that encloses an extrusion chamber 3 having the shape of the FIG. 8 in the sectional view, the extruder screws 8 extending in the longitudinal direction of the housing 2. At the outer periphery thereof, the screws 8 comprise helical screw flights 10, in particular for the advancement of the raw material and/or extrudate, which is arranged in the case of application in the extrusion chamber 3 between the surface of the screws 8 and the inner wall 4 of the housing 2. The screws 8 are mounted on one side of the housing 2, at a feed side of the extruder 1, and are connected to a gear stage (not shown), for example, via a drive shaft 9—in particular, via a spline shaft connection or a keyway connection—and driven by an electric motor (not shown). This may involve any desired configurations known to a person skilled in the art, in particular a tangential co-rotating twin-screw extruder, a tightly intermeshed co-rotating twin-screw extruder, a tangential counter-rotating twin-screw extruder, or a tightly intermeshed counter-rotating twin-screw extruder.

On the side opposite to the feed side, the housing 1 has the one exit opening 7. Here, the extrudate, in the present case a hot melt adhesive prepared from, in particular, a (co) polymer, e.g., a polypropylene(co)polymer, is discharged from the extruder 1 and connected to a pelletizer (not shown), in particular a string pelletizer, underwater pelletizer, or pelletizer having a hot die face, in order to transform the hot melt adhesive into a bulk material. The extruder 1 may further have a plurality of heating elements (not shown), which heat the housing 2 and the (co)polymer arranged in the extruder 1, and are preferably controllable independently of one another. The heating elements may, however, also be configured as cooling elements. The heating elements may, in particular, be embodied in the form of electrical cartridge heaters or heating shells. In addition, in particular in order to cool the housing 2, it is possible to use, for example, individually controllable water circuits (not shown). In this manner, overheating of the (co)polymer and any associated decomposition of material can be avoided. Preferably, however, these capabilities for heating and cooling do not serve to melt the (co)polymer, but rather to control the temperature of the process. The melting takes place via the introduction of energy by rotation of the screws 8.

In the area of the feed side, the extruder 1 has a first filling opening 5 having a filling hopper 6, in which a (co)polymer and optionally other additives can be supplied under a protective gas atmosphere. The illustrated extruder 1 comprises a plurality of extruder zones in the first extrusion section 21. This may refer to functional zones, such as an entry zone in which the (co)polymer is fed into the extruder 1 via the feed opening 5 and advanced forward by the extruder screws 8; a plastification zone or compression zone, in particular in order to melt or plasticize the (co)polymer, in which an initiator, in the present case at least one peroxide, is added as a radical former by means of a peroxide addition 11, a feed opening in the wall of the housing 2. Alternatively, it is possible for the initiator not to be added in the plastification zone, but rather to have already been added in the entry zone or in the filling opening 5 with the (co)polymer. Furthermore, a degradation zone or a high-temperature zone may be provided, in which, in particular, the initiator can be decomposed; and optionally, a temperature increase zone that ends the first extrusion section 21, for further decomposition of the remaining initiator.

The extruder 1, and in particular the screws 8, are designed so that in the first extrusion section 21, the (co)polymer is thermomechanically degraded by shear stress in the presence of said peroxide as a radical former, in order to produce a first degraded (co)polymer. This degradation in the first extrusion section 21 takes place in a temperature range of 100° C. to 320° C. In the region of the first extrusion section 21, the extruder 1 may additionally comprise degassing openings (not shown) in order to suction volatile components, in particular those of the peroxide, by means of a vacuum applied to the degassing opening.

For further degradation of the (co)polymer, having been degraded in this manner in the first extrusion section 21, the (co)polymer is transferred into the directly adjoining second extrusion section 22. In the embodiment shown, in the transfer of the degraded (co)polymer, the degraded (co)polymer still has a residual amount of peroxide, which is less than 0.01 wt % with respect to the total amount of the first degraded (co)polymer.

Provided in the second extrusion section is a gas mixture addition 12, in the form of a feed opening in the wall of the housing 2, wherein oxygen and/or an oxygen-containing gas mixture is added into the second extrusion section 22 to the (co)polymer having been degraded in the first extrusion section 21, in order to thereby enable further degradation of the first degraded (co)polymer under further shear stress in order to produce a second degraded (co)polymer. Where an oxygen-containing gas mixture is used, the oxygen content there amounts to at least 5 vol %. Said degradation in the second extrusion section 22 takes place, in the depicted embodiment, in a temperature range of 200° C. to 450° C. The illustrated extruder 1 additionally comprises means for controlling the temperature of the oxygen and/or oxygen-containing gas mixture supplied at the gas mixture addition 12. In the embodiment depicted, a minimum temperature of 50° C. upon addition has proven useful. The oxygen and/or oxygen-containing gas mixture is added at a pressure of at least 5 bar.

In order to prevent the oxygen and/or oxygen-containing gas mixture that has been introduced into the second extrusion section 22 from escaping into the first extrusion section 21 and in particular from escaping from the filling opening 5, the first extrusion section 21 is separated from the second extrusion section 22 by a sealing means, and the gas mixture addition 12 is arranged downstream of the sealing means in the direction 27 of feeding.

The sealing means is provided by a damming unit in the present embodiment. An essential feature here are annular thickenings 15 of the screws 8, provided upstream of the second extrusion section 22 and thus upstream of the gas mixture addition 12 in the direction 27 of feeding, the annular thickenings preferably having a maximum of the same diameter as the screw flights 10. Associated with these thickenings 15, quasi-annular recesses 14 are introduced into the inner wall 4 of the housing 2, and are arranged upstream of the thickenings 15 in the direction 27 of feeding or in the axial direction of the screw 8. The thickenings 15 result in a throttled melt passage between the screw 8 and the inner wall 4 of the housing 2, so that a damming unit can be provided for the melt. In addition, the recesses 14 provide a damming space 16 in which the melt, having been dammed by the thickenings 15, is accumulated. The dammed-up melt of the (co)polymer, having been degraded in the first extrusion section 21, seals the first extrusion section 21 from the second extrusion section 22. Thus, a sealing means can be provided by the thicknesses 15 and additionally via the recesses 14 and the resulting damming space 16, which sealing means separates the first extrusion section 21 from the second extrusion section 22, in order to prevent the oxygen and/or oxygen-containing gas mixture that has been introduced into the second extrusion section 22 from escaping into the first extrusion section 21 and in particular from the filling opening 5.

In the second expansion section 22, in addition to the supplying of the oxygen and/or oxygen-containing gas mixture via the gas mixture addition 12, it is also conceivable to supply at least one additional additive via a feed opening (not shown).

The extruder 1 and in particular the screws 8 are also designed in the second extrusion section 22 such that the (co)polymer is thermomechanically degraded by shear stress in the presence of the oxygen and/or oxygen-containing gas mixture in order to obtain a second degraded (co)polymer. At the end of the extruder 1 in the direction 27 of feeding, a degassing means 13 is provided in the region of the second extrusion section 22, in order to suction volatile components, in particular those of the oxygen and/or oxygen-containing gas mixture having been introduced via the gas mixture addition 12, by means of a vacuum applied to the degassing means 13.

FIG. 2 illustrates an alternative embodiment of an extruder 1 according to the invention, which comprises fundamentally the same technical features as the extruder 1 illustrated in FIG. 1. The extruder 1 here is also subdivided into two extrusion sections 21, 22, wherein a (co)polymer that has been introduced via the filling hopper 6 and the filling opening 5 is degraded in the first extrusion section 21 by means of a peroxide added via the peroxide addition 11, under shear stress by the screws 8, in order to produce a first degraded (co)polymer. In the second extrusion section 22 adjoining the first extrusion section 21, oxygen and/or an oxygen-containing gas mixture is supplied via the gas mixture addition 12 in order to further degrade the first degraded (co)polymer under shear stress. The essential difference resides in the design of the sealing means between the first extrusion section 21 and the second extrusion section 22. Contrary to the screw flights 10 used for the degrading and the advancing of the melt, the screws 8 comprise a damming section 17 in the region of the sealing means between said extrusion sections 21, 22; the screw flights 10 there have a lower pitch than in the remaining regions, in order to make it possible, in this region, to reduce the feed rate in the direction 27 of feeding and dam the melt in the damming space 16 in the region of the recesses 14, which are arranged here upstream of the damming section 17 in the direction 27 of feeding. This damming makes it possible to seal the second extrusion section 22 from the first extrusion section 21, in order to prevent the oxygen and/or oxygen-containing gas mixture having been introduced into the second extrusion section 22 from escaping into the first extrusion section 21 and in particular from the filling opening 5.

FIG. 3 illustrates another alternative of an extruder 1 according to the invention. In essence, the extruder 1 illustrated here resembles the extruder 1 from FIG. 1. The addition of the peroxide as the radical former for the first extrusion section has already been added here via the filling hopper 6 into the filling opening 5. The extruder 1 again has the first extrusion section 21 for thermomechanically degrading the (co)polymer, and also has a second extrusion chamber 22 adjoining same in order to further degrade the (co)polymer with the use of oxygen or an oxygen-containing gas mixture added via the gas mixture addition 12. The second extrusion chamber 22 is also again separated here from the second extrusion section 22 by a sealing means provided by the recesses 14, thickenings 15, and damming space 16, so that the oxygen and/or oxygen-containing gas mixture having been introduced into the second extrusion section 22 can be securely prevented from escaping into the first extrusion section 21 and in particular from the filling opening 5. The second extrusion chamber 22 further comprises a degassing means 13 arranged downstream of the gas mixture addition 12 in the direction 27 of feeding.

The depicted extruder 1 further comprises a third extrusion section 28 downstream of the second extrusion section 22 in the direction 27 of feeding and adjoining same. The second extrusion chamber 22 is there separated from said third extrusion section 28 by a sealing means provided by second recesses 18, second thickenings 19, and a second damming space 20, such that the oxygen and/or oxygen-containing gas mixture having been introduced into the second extrusion section 22 can be securely prevented from escaping into said third extrusion section 28.

The third extrusion section 28 comprises a second filling hopper 23 and a second filling opening 24, through which other additives or auxiliaries can be added. In the present embodiment, it would be possible to add, for example, a tackifying resin, a wax, a cross-linking agent, a filler, an antioxidant, an adhesion promoter, an oil, a plasticizer, or an elastomer, and/or a plurality thereof, and/or any mixtures thereof, e.g., via the second filling hopper 23. Once supplied, the additive is blended by the screws 8 with the degraded (co)polymer under shear stress, in order to produce the hot melt adhesive. Also provided are another addition opening 25 and, at the end of the third extrusion section 28, another degassing opening 25, in order to suction volatile components, in particular residual components of the oxygen and/or oxygen-containing gas mixture, for example, by means of a vacuum.

1. Extruder
2. Housing
3. Extrusion chamber
4. Inner wall
5. Filling opening
6. Filling hopper
7. Discharge opening
8. Screws
9. Drive shaft
10. Screw flight
11. Peroxide addition
12. Gas mixture addition
13. Degassing means
14. Recesses
15. Thickenings
16. Damming space
17. Damming section
18. Second recess
19. Second thickening
20. Second damming space
21. First extrusion section
22. Second extrusion section
23. Second filling hopper
24. Second filling opening
25. Other addition opening
26. Other degassing opening
27. Direction of feeding
28. Third extrusion section

The invention claimed is:

1. A method for degrading (co)polymers in an extruder (1), the method comprising the steps of:
    a) supplying a (co)polymer by means of a charging opening (5) into a first extrusion section (21) of the extruder (1);
    b) degrading the (co)polymer under shear stress in the first extrusion section (21), in the presence of from 0.02 to 5 wt % of a compound containing peroxo or diazo group to produce a first degraded (co)polymer;
    c) transferring the first degraded (co)polymer from the first extrusion section (21) into a second extrusion section (22) of the extruder (1), wherein the first extrusion section (21) is separated from the second extrusion section (22) by a sealing means (14, 15, 16, 17);
    d) supplying oxygen gas into the second extrusion section (22) by means of a feed opening (12), wherein the feed opening (12) is arranged downstream of the sealing means (14, 15, 16, 17) in the direction (27) of extrusion; and
    e) further degrading the first degraded copolymer under shear stress in the second extrusion section (22), in the presence of an oxygen gas, in order to produce a second degraded (co)polymer,
    with the provision that the sealing means (14, 15, 16, 17) is suitable for preventing the escape of the oxygen gas from the charging opening (5).

2. The method according to claim 1, characterized in that the (co)polymer is added under a protective gas atmosphere in the charging opening (5).

3. The method according to claim 2, characterized in that the radical former is added in the first extrusion section (21) via the charging opening (5) and/or via a radical former adding means (11).

4. The method according to claim 3, characterized in that the radical former is a peroxide.

5. The method according to claim 1, characterized in that upon entry in the second extrusion section (22), the first degraded (co)polymer has a residual amount of radical formers that is less than 0.01 wt % with respect to the total amount of the first degraded (co)polymer.

6. The method according claim 1, characterized in that the degradation of the (co)polymer in the first extrusion section (21) is carried out at a temperature of 100° C. to 320° C.

7. The method according to claim 6, characterized in that the further degradation of the first degraded (co)polymer in the second extrusion section (22) is carried out at a temperature of 200° C. to 450° C.

8. The method according to claim 1, characterized in that the supplied oxygen gas is pure oxygen or an oxygen-containing gas mixture, wherein said gas mixture comprises an oxygen content of at least 5 vol %.

9. The method according to claim 8, characterized in that the supplied oxygen gas contains an ethylenically unsaturated carboxylic acid or derivatives.

10. The method according to claim 1, characterized in that the oxygen gas prior to the addition has at least a temperature of 50° C.

11. The method according to claim 10, characterized in that the oxygen gas is added at a pressure of at least 5 bar.

12. The method according to claim 1, characterized in that the second degraded (co)polymer is transferred into another extrusion section (28), wherein the second extrusion section (22) is separated from the other extrusion section (28) by a sealing means (18, 19, 20) and the other extrusion section (28) comprises an additional charging opening (24) and/or feed opening (25).

13. The method according to claim 12, characterized in that the sealing means (14, 15, 16, 17, 18, 19, 20) is formed by a return feeding element and/or a damming unit in the extruder screw (8).

14. The method according to claim 13, characterized in that the second and/or other extrusion section (22, 28) comprises a decomposition means (13, 26) that is arranged downstream of the feed opening (5, 25) in the direction (27) of extrusion in order to decompose the oxygen gas.

15. The method according to claim 14, characterized in that after leaving the second or other extrusion section (22, 28), the second degraded (co)polymer is transformed into a bulk material.

* * * * *

UNITED STATES PATENT AND TRADEMARK OFFICE
CERTIFICATE OF CORRECTION

PATENT NO.        : 9,683,065 B2
APPLICATION NO.   : 14/735284
DATED             : June 20, 2017
INVENTOR(S)       : Dirk Kasper, Andreas Brenger and Ilja Thierbach It is certified that error appears in the above-identified patent and that said Letters Patent is hereby corrected as shown below:

In the Specification

Column 8, Line 16: Change "1010" to -- 101® --.

Signed and Sealed this
Fifteenth Day of May, 2018

Andrei Iancu
*Director of the United States Patent and Trademark Office*